United States Patent
Gollier

(10) Patent No.: US 8,585,206 B2
(45) Date of Patent: Nov. 19, 2013

(54) METHODS FOR OPERATING SCANNING LASER PROJECTORS TO REDUCE SPECKLE AND IMAGE FLICKER

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 492 days.

(21) Appl. No.: 12/825,411

(22) Filed: Jun. 29, 2010

(65) Prior Publication Data

US 2011/0317130 A1    Dec. 29, 2011

(51) Int. Cl.
*G03B 21/14* (2006.01)

(52) U.S. Cl.
USPC .............................................. 353/20

(58) Field of Classification Search
USPC ............................. 353/20; 359/599
See application file for complete search history.

(56) References Cited

U.S. PATENT DOCUMENTS

| | | | |
|---|---|---|---|
| 6,956,878 B1 * | 10/2005 | Trisnadi | 372/27 |
| 7,653,097 B2 | 1/2010 | Gollier et al. | 372/27 |
| 2006/0023164 A1 * | 2/2006 | Sakaguchi et al. | 353/20 |
| 2007/0070309 A1 * | 3/2007 | Stern | 353/119 |
| 2008/0297731 A1 | 12/2008 | Powell et al. | 353/37 |
| 2009/0021801 A1 * | 1/2009 | Ishihara | 358/475 |
| 2009/0190618 A1 | 7/2009 | Kuksenkov et al. | |
| 2010/0097534 A1 | 4/2010 | Teller et al. | |
| 2010/0277704 A1 | 11/2010 | Gollier | |

* cited by examiner

*Primary Examiner* — Georgia Y Epps
*Assistant Examiner* — Danell L Owens
(74) *Attorney, Agent, or Firm* — Svetlana Short

(57) ABSTRACT

Methods for operating a light source of a scanning laser projector to reduce speckle and image flicker in projected images are disclosed. The methods generally include projecting an image comprising a plurality of frames with a light source of the scanning laser projector. Simultaneously, a speckle reduction sequence comprising uncorrelated speckle patterns and partially correlated speckle patterns is projected with the light source of the scanning laser projector. The speckle reduction sequence is projected by varying a property of an output beam of the light source of the scanning projector. The duration of the speckle reduction sequence may be less than about 0.04 seconds or from about 0.07 seconds to about 0.13 seconds.

18 Claims, 8 Drawing Sheets

METHODS FOR OPERATING SCANNING LASER PROJECTORS TO REDUCE SPECKLE AND IMAGE FLICKER

CROSS REFERENCE TO RELATED APPLICATIONS

The present specification is related to U.S. Patent Application Ser. No. 61/347,032 entitled "Systems for Reducing Speckle and Maintaining Depth of Focus in Laser Projected Images" filed Jan. 4, 2010, but does not claim priority thereto.

BACKGROUND

1. Field

The present specification generally relates to methods for reducing speckle in images and, more specifically, to methods for reducing speckle in images projected with laser light sources.

2. Technical Background

Laser speckle causes undesirable effects associated with the use of coherent illumination sources in general and laser-based projection systems in particular. Laser speckle is an undesirable random intensity variation perceived by the eye or other detection system. Speckle may result when a coherent light source is used to illuminate a rough surface such as a screen, wall, or any other object that produces a diffused reflection or transmission. In particular, a multitude of small areas of the screen or other reflecting objects scatter light into a multitude of reflected beams with different points of origination and different propagation directions. At an observation point, such as the eyes of an observer or an optical detector such as the sensor of a camera, these reflected beams interfere constructively to form a bright spot or destructively to form a dark spot, thereby producing a random granular intensity pattern known as speckle.

The standard quantitative measure of the amount of speckle visible is speckle contrast. Speckle contrast is defined as the ratio between the standard deviation of intensity and the mean intensity detected by the eye or another optical detector. When the speckle contrast is 100% the speckle is considered to be "fully developed" which yields the lowest image quality to an observer and/or an optical detector. The human eye can detect speckle at contrast levels as low as 5% or even 1% depending on a number of variables including the wavelength of the projected light and brightness of the illumination as well as variations in perception amongst different individuals.

There is significant interest in image projectors based on coherent laser sources instead of incoherent lamps or LEDs. This is because of the potential compactness, power efficiency, brightness, color saturation and other properties afforded by laser sources. Because of the ability of the human eye to detect speckle in a projected image, even modest amounts of speckle may be distracting to an observer and detract from the perceived quality of a projected image.

Accordingly, a need exists for alternative methods for operating scanning laser projectors to reduce the amount of speckle in images projected with the scanning laser projectors.

SUMMARY

According to one embodiment, a method for operating a light source of a scanning laser projector includes projecting an image comprising a plurality of frames with the light source of the scanning laser projector at a frame rate of the scanning laser projector. At least one of the polarization, wavelength or angle of incidence of the light source is changed to create a speckle reduction sequence comprising a plurality of speckle patterns. The speckle reduction sequence is projected with the light source as the intensity of the light source is modulated to produce the image. The speckle reduction sequence is less than about 0.04 seconds or from about 0.07 seconds to about 0.13 seconds.

In another embodiment, a method for operating a light source of a scanning laser projector includes projecting an image comprising a plurality of frames with the light source of the scanning laser projector. Simultaneously, a speckle reduction sequence is projected with the light source of the scanning laser projector. The speckle reduction sequence includes uncorrelated speckle patterns and partially correlated speckle patterns. The speckle reduction sequence is projected by varying a property of an output beam of the light source of the scanning laser projector to produce the uncorrelated speckle patterns and the correlated speckle patterns. A duration of the speckle reduction sequence may be from about 0.07 seconds to about 0.13 seconds. A number k of the uncorrelated speckle patterns in the speckle reduction sequence may be an integer greater than 3. A number l of the partially correlated speckle patterns in the speckle reduction sequence may also be an integer greater than 3.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
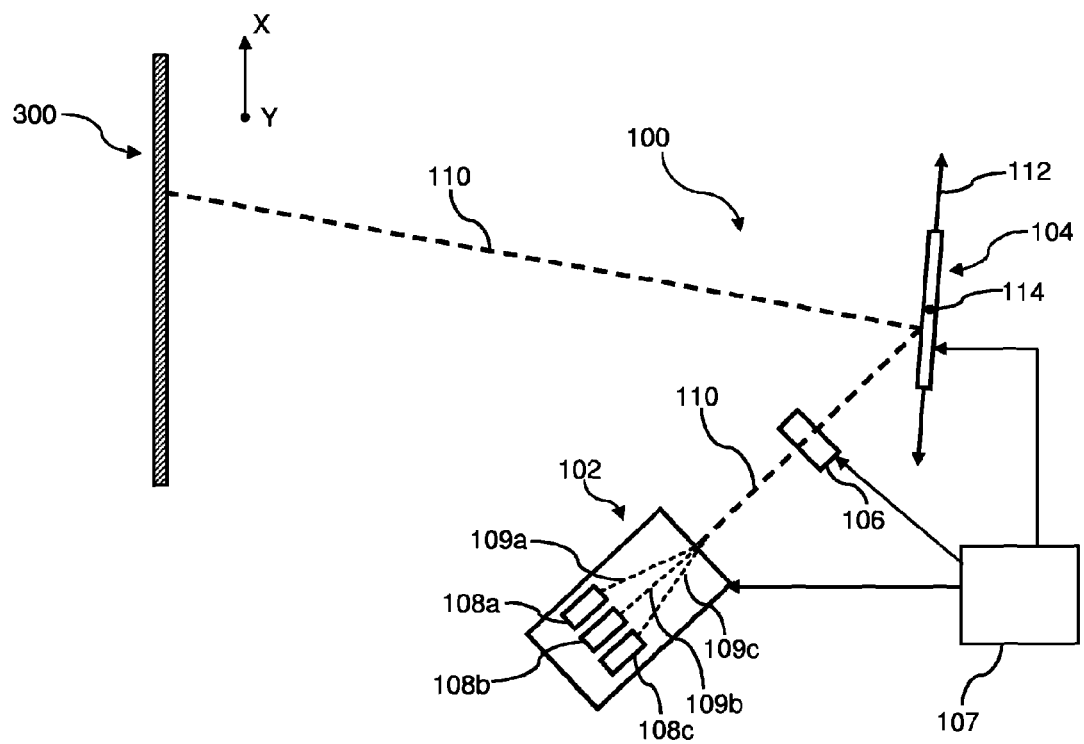
FIG. 1 schematically illustrates one embodiment of a scanning laser projector for use in conjunction with one or more embodiments of the methods for operating a light source of a scanning laser projector described herein.

Embodiments of methods for operating a light source of a scanning laser projector to reduce speckle and image flicker will now be described in detail with specific reference to the appended drawings. The method generally comprises projecting an image with a light source of a scanning laser projector. Simultaneous with projecting the image, a property of the output beam of the light source is varied to project a speckle reduction sequence comprising uncorrelated speckle patterns and partially correlated speckle patterns to reduce speckle in the projected image. The speckle reduction sequence is projected during a time interval sufficient to reduce flicker in the image. Various embodiments of the method for reducing speckle and image flicker will be described in more detail herein.

In describing the various embodiments of the methods for reducing speckle and image flicker, reference will be made to uncorrelated speckle patterns and partially correlated speckle patterns. The term "speckle pattern" refers to a discrete image projected with a light source and having speckle characteristics unique to that particular discrete image. The terms "uncorrelated speckle pattern" and "partially correlated speckle pattern" refer to a quantitative assessment of the correlation function CF between two images. Specifically, each speckle pattern is an image comprising a matrix of pixel elements $I_x$. The correlation function CF between two images $I_1$ and $I_2$ may be defined as:

$$CF = \sum \frac{(I_1 - I_{1Avg})(I_2 - I_{2Avg})}{\nabla I_1 * \nabla I_2},$$

where:

$I_1$ is a matrix of pixels representing the first image;
$I_2$ is a matrix of pixels representing the second image;
$I_{1Avg}$ is the average intensity of the pixels in the matrix $I_1$;
$I_{2Avg}$ is the average intensity of the pixels in the matrix $I_2$;
$\nabla I_1$ is the standard deviation of the intensity of the pixels in matrix $I_1$ where $\nabla I_1 = \sqrt{\Sigma(I_1 - I_{1Avg})^2}$; and $\nabla I_2$ is the standard deviation of the intensity of the pixels in matrix $I_2$ where $\nabla I_2 = \sqrt{\Sigma(I_2 - I_{2Avg})^2}$.

Two images are perfectly correlated when the absolute value of the correlation factor (i.e., |CF|) is equal to 1. Using the same relationship, two images are perfectly uncorrelated when the absolute value of the correlation factor CF is equal to zero. However, two images are considered uncorrelated when the absolute value of the correlation function is below 0.1.

For purposes of the present description, a specific speckle pattern $I_x$ in a speckle reduction sequence comprising $I_n$ speckle patterns is an uncorrelated speckle pattern when the absolute value of the correlation factor CF between the specific speckle pattern $I_x$ and any other speckle pattern in the speckle reduction sequence is from about 0 to about 0.1. Further, a specific speckle pattern $I_x$ in a speckle reduction sequence comprising $I_n$ speckle patterns is a partially correlated speckle pattern when the absolute value of the correlation factor CF between the specific speckle pattern $I_x$ and at least one other speckle pattern in the speckle reduction sequence is from about 0.4 to about 0.6.

FIG. 1 schematically depicts a scanning laser projector system which may be used in conjunction with the methods for operating a light source of a laser scanning projector scanning system to reduce speckle and image flicker described herein. The scanning laser projector system 100 generally comprises a composite light source 102 and a scanning mirror 104. In one embodiment, the scanning laser projector system 100 may also comprise a polarization rotator 106, as depicted in FIG. 1. The scanning laser projector system 100 is programmed to scan an output beam 110 produced by the composite light source 102 to create a two-dimensional image on a projection surface 300. The projection surface 300 may be a wall or a projector screen, for example. In the embodiment shown in FIG. 1, the output beam 110 from the composite light source 102 is redirected by the first scanning mirror 104 onto the projection surface 300 and scanned over the projection surface 300 in the x-direction and y-direction of the coordinate axes depicted in FIG. 1 to form an image on the projection surface 300. The scanning laser projector system 100 may be used to display static images (e.g., text), moving images (e.g., video), or combinations of static images and moving images. In one embodiment, the system may be compact such that it may be incorporated into a relatively small device, such as a hand-held projector, cell phone, personal data assistant, notebook computer or other similar devices. However, in other embodiments, the system may be a standard size projector system for projecting large format images.

In the embodiment of the scanning laser projector system 100 depicted in FIG. 1, the composite light source 102 comprises one or more individual light sources 108a, 108b, 108c that are operable to emit coherent light beams 109a, 109b, 109c at different wavelengths. For example, the composite light source 102 depicted in FIG. 1 comprises three individual light sources 108a, 108b, 108c capable of emitting coherent light beams having wavelengths in the green, blue and red portions of the visible spectrum, respectively. The coherent output beams 109a, 109b, 109c emitted by each individual light source 108a, 108b, 108c may be combined and collimated with various optical components (not shown), such as lenses, mirrors and the like, to produce a collimated output beam 110 that consists of the coherent output beams 109a, 109b, 109c from each individual light source 108a, 108b, 108c. In other embodiments (not shown), the composite light source 102 may utilize more of fewer individual light sources. For example, the composite light source may comprise one individual light source, two individual light sources or three or more individual light sources. It should also be understood that the individual light sources may emit coherent light beams having wavelengths other than wavelengths in the red, blue or green portions of the visible spectrum.

Figure 2:
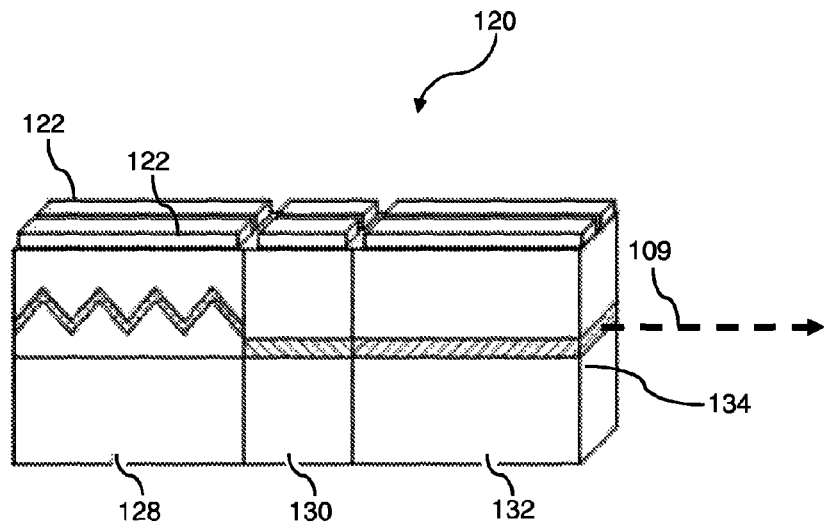
FIG. 2 schematically depicts one embodiment of a DBR laser for use as a light source in a scanning laser projector.

In one embodiment, the individual light sources 108a, 108b, 108c are DBR lasers, such as the DBR laser 120 schematically illustrated in FIG. 2. The DBR laser 120 may generally comprise a semiconductor laser with a wavelength selective section 128, a phase matching section 130, and a gain section 132. The wavelength selective section 128, which may also be referred to as the distributed Bragg reflector or DBR section, typically comprises a first-order or second-order Bragg grating positioned outside the active region of the laser cavity. This section provides wavelength selection as the grating acts as a mirror whose reflection coefficient depends on wavelength. The wavelength of the output beam 109 emitted by the DBR laser may be adjusted by varying the current injected into the wavelength selective section 128 at electrical leads 122. For example, in one embodiment, current injected into the wavelength selective section 128 of the DBR laser 120 can be used to control the wavelength of the coherent output beam 109 emitted from the output facet 134 of the DBR laser 120 by altering the operating properties of the laser. More specifically, the injected current may be used to control the temperature of the wavelength selective section 128 and/or the index of refraction of the wavelength selective section 128. Accordingly, by adjusting the amount of current injected into the wavelength selective section, the wavelength of the coherent output beam 109 emitted by the laser source may be varied. Alternatively, current injected into the phase matching section 130 or gain section 132 may be similarly used to control the wavelength of the coherent output beam 109 emitted by the DBR laser.

While the individual light sources 108a, 108b, 108c have been described herein as comprising DBR lasers, it should be understood that other types of laser sources may be used. For example, the individual light sources 108a, 108b, 108c may comprise one or more single-wavelength lasers such as distributed feedback (DFB) lasers, vertical cavity surface-emitting lasers (VCSEL), diode pumped solid state lasers (DPSS), native green lasers, vertical external cavity surface-emitting lasers (VECSEL) or Fabry-Perot lasers.

Figure 3:
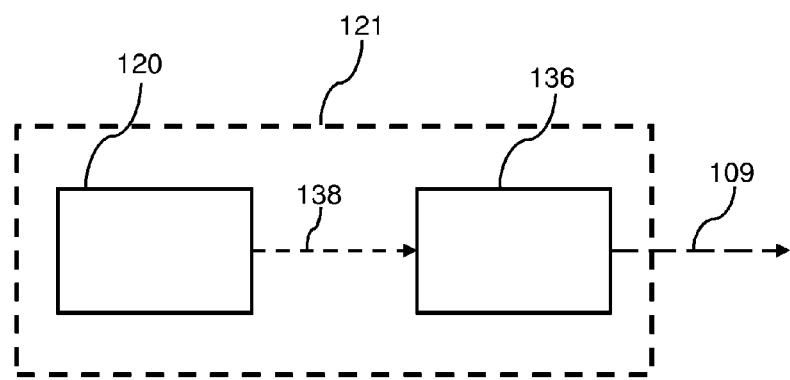
FIG. 3 schematically depicts one embodiment of a wavelength converted light source for use as a light source in a scanning laser projector.

In another embodiment, the individual light sources of the laser projection system may be wavelength converted light sources such as the wavelength converted light source 121 depicted in FIG. 3. The wavelength converted light source 121 generally comprises a semiconductor laser, such as a DBR laser 120 or similar laser device, optically coupled to a wavelength conversion device 136. The wavelength conversion device 136 converts the coherent beam 138 of the DBR laser into higher harmonic waves and outputs a coherent output beam 109 having a wavelength different than the wavelength of the coherent beam 138 of the DBR laser 120. This type of wavelength converted light source is particularly useful in generating shorter wavelength laser beams from longer wavelength semiconductor lasers and can be used, for example, as a visible laser source for laser projection systems.

Figure 4:
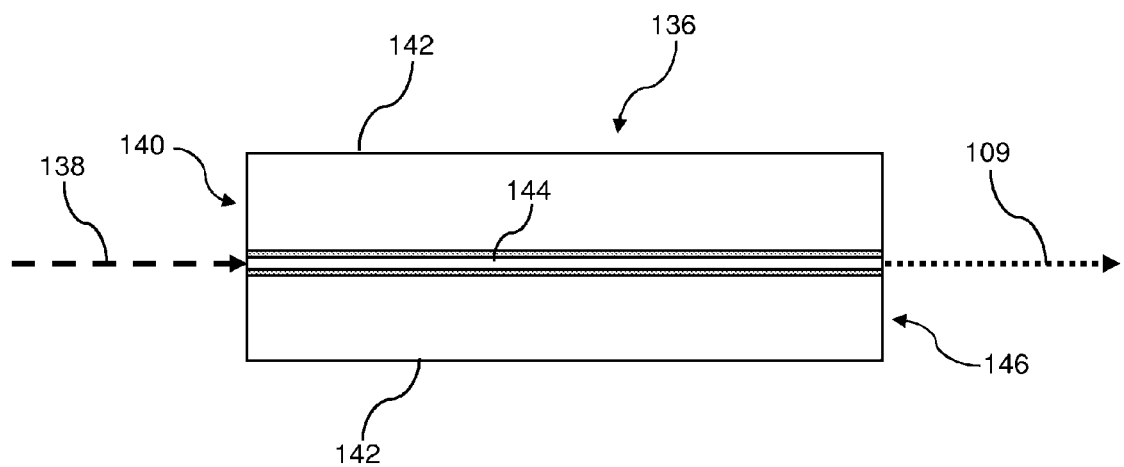
FIG. 4 schematically depicts an embodiment of a wavelength conversion device for use in a wavelength converted light source.

Referring now to FIG. 4, one embodiment of a wavelength conversion device 136 for use in a frequency converted light source is schematically depicted in cross section. The wavelength conversion device 136 generally comprises a bulk crystal material 142, such as MgO-doped lithium niobate, with a waveguide portion 144 which extends between an input facet 140 and an output facet 146. In one embodiment, the waveguide portion 144 is a periodically-poled lithium niobate (PPLN) crystal. When a coherent beam 138 having a first wavelength $\lambda_1$ (such as the coherent beam 138 of the DBR laser 120) is directed into the waveguide portion 144 of the wavelength conversion device 136, the coherent beam 138 is propagated along the waveguide portion 144 of the wavelength conversion device 136 where the coherent beam 138 is converted to a second wavelength $\lambda_2$. The wavelength conversion device 136 emits the wavelength converted coherent output beam 109 from the output facet 133. For example, in one embodiment, the coherent beam 138 emitted by the DBR laser 120 and directed into the waveguide portion 144 of the wavelength conversion device 136 has a wavelength of about 530 nm (e.g., the coherent beam 138 is an infrared light beam). In this embodiment, the wavelength conversion device 136 converts the infrared light beam to visible light and emits a wavelength converted coherent output beam 109 with a wavelength of about 530 nm (e.g., visible green light).

In the embodiment of the wavelength conversion device 136 depicted in FIG. 4, the wavelength of the coherent output beam 109 emitted by the wavelength conversion device 136 may be adjusted utilizing a variety of techniques. For example, the wavelength of the coherent output beam 109 of the wavelength conversion device 136 may be adjusted by applying an electric field to the wavelength conversion device 136 which, in turn, causes a change in the wavelength of the coherent output beam 109. In yet another embodiment, the wavelength of the coherent output beam 109 of the wavelength conversion device 136 may be adjusted by heating the wavelength conversion device 136 and/or the waveguide portion of the wavelength conversion device which, in turn, causes a change in the wavelength of the coherent output beam 109.

Figure 5:
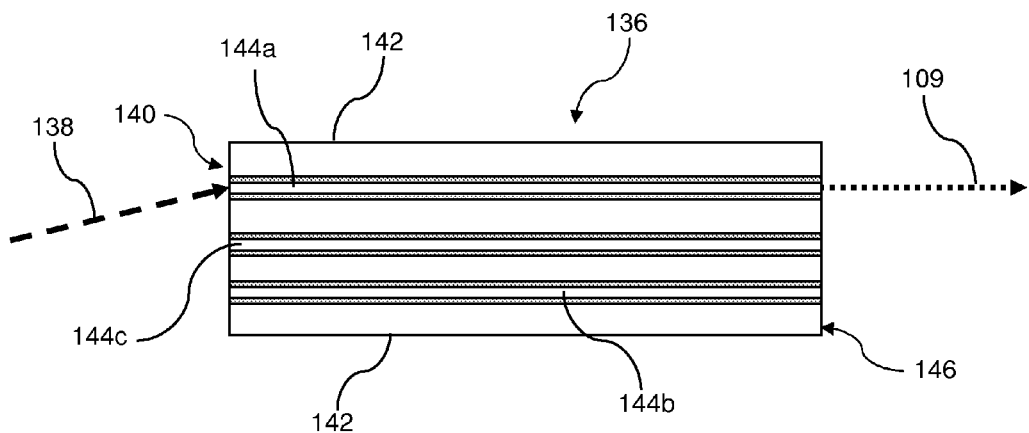
FIG. 5 schematically depicts one embodiment of a wavelength conversion device for use in a wavelength converted light source.

Referring now to FIG. 5, another embodiment of a wavelength conversion device 136 for use in a wavelength converted light source is schematically depicted in cross section. In this embodiment, the wavelength conversion device 136 has a similar construction as the wavelength conversion device 136 depicted in FIG. 4. However, in this embodiment, the wavelength conversion device 136 comprises a first waveguide portion 144a, a second waveguide portion 144b, and a third waveguide portion 144c, each of which extend between the input facet 140 and the output facet 146 of the wavelength conversion device 147. Each of the waveguides 144a, 144b, 144c are tuned to produce an output beam with a wavelength different than the other waveguides. In this embodiment, a semiconductor laser (not shown) optically coupled to the wavelength conversion device 136 may be mechanically coupled to an actuator which can be utilized to optically couple the semiconductor laser to the different waveguides by adjusting the position of the semiconductor laser. For each waveguide 144a, 144b, 144c, the wavelength of the semiconductor laser may be tuned to the waveguide such that the wavelength conversion device 136 emits a coherent output beam 109 having the desired wavelength. Accordingly, the wavelength of the wavelength converted light source may be adjusted by coupling the DBR laser to different waveguide portions of the wavelength conversion device.

Referring again to FIG. 1, in the embodiments described herein, the output beam 110 of the composite light source 102 is scanned over the projection surface 300 with a first scanning mirror 104 as described above. The first scanning mirror 104 is positioned in the optical pathway of the output beam 110 and reflects the output beam 110 towards the projection surface 300. The scanning mirror 114 may comprise a mirror coupled to an actuator that is operable to adjust the orientation of the mirror about at least two axes 112, 114. For example, in one embodiment, the actuator is a micro-electro-mechanical system (MEMS) coupled to a mirror. The MEMS device is operable to rotate the mirror about a first axis 112 and a second axis 114 thereby scanning the reflected output beam 110 in the y-direction and the x-direction on the projection surface 300 to form an image.

In the embodiment of the scanning laser projector system 100 depicted in FIG. 1, the system further comprises a polarization rotator 106. The polarization rotator is positioned in the optical pathway of the composite light source 102 such that the output beam 110 of the composite light source 102 passes through the polarization rotator 106 before reaching the first scanning mirror 104. The polarization rotator 106 is operable to adjust the polarization of the output beam 110 from a first polarization to a second polarization. The second polarization may be orthogonal with the first polarization. Alternatively, the second polarization may be an intermediate polarization which is non-orthogonal with the first polarization. In one embodiment, the polarization rotator 106 may be a liquid crystal polarization rotator or a similar device suitable for rotating the polarization of a light beam.

While the embodiment of the scanning laser projector system 100 depicted in FIG. 1 includes a polarization rotator 106, it should be understood that, in other embodiments, the scanning laser projector system may be constructed without the polarization rotator.

The scanning laser projector system 100 is programmed to perform the method for reducing speckle and image flicker described herein. Specifically, the scanning laser projector system 100 may include one or more system controllers 107, such as microcontrollers, programmable logic controllers, and the like, which are communicatively coupled to the composite light source 102, the first scanning mirror 104 and the polarization rotator 106. The system controller 107 is programmed to control the composite light source 102, the first scanning mirror 104, and the polarization rotator 106 to generate and project single or multi-color images and simultaneously reduce speckle and image flicker in the projected images. The system controller 107, along with image projection software and associated electronics known in the art, may provide the composite light source 102 with one or more image data signals (e.g., laser drive currents) that carry encoded image data. Where the output beam 110 comprises a plurality of individual light sources 108a, 108b, 108c, the system controller 107 may individually control the wavelength, gain and/or intensity of each of the coherent output beams 109a, 109b, or 109c emitted by the individual light sources 108a, 108b, 108c. For example, the encoded image data causes gain or intensity variations in one or more of the output beams 109a, 109b, 109c of the individual light sources 108a, 108b, 108c which, in turn, causes corresponding gain or intensity variations in the output beam 110 of the composite light source 102. The resulting gain or intensity variations in the output beam 110 form an image as the output beam is scanned over the projection surface 300 with the first scanning mirror 104.

Still referring to FIG. 1, the method for operating a light source of a scanning laser projector system will now be described with reference to the light source 108a of the composite light source 102. However, it should be understood that the same control methods may also be applied to the other light sources 108b and 108c in order to reduce speckle and image flicker.

The method for operating a light source 108a of a scanning laser projector system 100 includes projecting an image comprising a plurality of frames with the light source 108a. To create the image, the system controller 107 supplies the light source 108a with an image data signal which produces gain or intensity variations in the output beam 109a emitted by the light source 108a as described above. The output beam 109a may be combined with one or more other output beams of different wavelengths (i.e., output beams 109b, 109c) to form output beam 110 which is redirected to the projection surface 300. The first scanning mirror 104 rapidly scans the output beam 110 over the projection surface 300 to produce a plurality of frames which, when integrated by a detector (such as the human eye) form the image encoded in the image data signal supplied to the light source 108a. In general, the scanning laser projector projects individual frames at a rate of 60 frames/second (i.e., 60 Hz). Each pixel in each frame (i.e., each discrete location of the beam spot on the projection surface 300) is illuminated for about 20 nanoseconds.

As the intensity or gain of the light source 108a is varied with the image data signal to produce an image, a physical property of the corresponding output beam 109a may be simultaneously varied to reduce speckle in the projected image. More specifically, a physical property of the output beam 109a is varied such that a speckle reduction sequence is projected with the output beam 109a of the light source 108a at the same time the image is projected with the light source 108a. The speckle reduction sequence may include a plurality of speckle patterns $I_n$ where n is the total number of speckle patterns in the sequence. In the embodiments described herein, the total number n of speckle patterns in the speckle reduction sequence is at least 8.

In general, speckle can be reduced by varying the speckle pattern superimposed on the projected image as a function of time. If the speckle pattern is varied fast enough (i.e., faster than the integration time of the human eye), then the projected speckle patterns are averaged by the human eye and results in an impression that the contrast of the speckle is decreased. For example, if the polarization of the light hitting a screen changes from a first linear polarization S to a second linear polarization P, two uncorrelated speckle patterns are generated (i.e., one with the first polarization and one with the second polarization). By switching the polarization state from S to P faster than the integration time of the human eye, the apparent speckle contrast is reduced by a square root of two.

In laser scanning projectors such as that depicted in FIG. 1, the light beam remains at a given location for a very short period of time (on the order of 20 nS), referred to as the pixel duration. The consequence is that, unless the speckle pattern can be modified faster than the pixel duration, the fastest speed at which different speckle patterns can be projected is equal to the frame rate, which is typically 60 Hz for most projection systems. When only two uncorrelated speckle patterns are projected by, for instance, switching between S and P polarization states, speckle is still reduced by a square root of two since 30 Hz is still faster than the human response time for high spatial frequency features such as speckle. A square root of two reduction in speckle is usually not sufficient to decrease speckle to an acceptable level and more uncorrelated speckle patterns are needed to further reduce the perceived speckle contrast. However, by projecting, for instance, 4 uncorrelated speckle patterns at the frame rate, a sequence of 4 images (A, B, C, D/A, B, C, D/ . . . ) is projected. Since the frequency at which those images are projected (15 Hz) is slower than the response time of the human eye, image flicker results.

One approach to reducing image flicker comprises projecting longer speckle reduction sequences (i.e., speckle reduction sequences projected at slower frequencies). Because the number of uncorrelated speckle patterns may be limited, longer speckle reduction sequences may be created from a series of uncorrelated and correlated speckle patterns. Experiments indicate that, when using speckle reduction sequences at 10 Hz and slower, image flicker is reduced and observers can see speckle slowly moving as a function of time. However, there is a limit in how much the duration of a speckle reduction sequence can be increased. Indeed, when the sequence is too slow, adding additional uncorrelated speckle patterns does not improve the quality of the image further. Experiments indicate that, with high spatial frequency noise such as speckle, the duration of the speckle reduction sequence should be kept below 0.13 seconds (7.5 Hz) as the amount of image improvement diminishes beyond that limit.

In one embodiment, the speckle reduction sequence may have a duration of greater than about 0.07 seconds to about 0.13 seconds (i.e., the speckle reduction sequence has a repetition rate from about 7.5 Hz to about 15 Hz). In another embodiment, the speckle reduction sequence may have a duration of greater than about 0.1 seconds (i.e., the speckle reduction sequence has a repetition rate of less than 10 Hz) and would not exceed 0.13 seconds (7.5 Hz). Specifically, it has been determined that speckle reduction sequences with durations greater than 0.07 seconds significantly reduce image flicker in the image that is simultaneously projected with the speckle reduction sequence and improve the perceived quality of the projected image. Accordingly, speckle reduction sequences having durations of greater than about 0.07 seconds can be used to both reduce the perceived amount of speckle in the projected image and reduce image flicker in the projected image.

In embodiments where at least 6 uncorrelated speckle patterns (i.e., the number of uncorrelated speckle patterns k=6) are produced by, for example, switching between two different polarization states and adjusting the wavelength of the light source to three different wavelengths having sufficient separation to produce uncorrelated speckle patterns, producing speckle reduction sequences at less than 10 Hz can easily be done by sequentially adjusting the polarization and the wavelength to produce a sequence of partially correlated and uncorrelated speckle reduction patterns.

In embodiments where only 4 uncorrelated speckle patterns are available, one possibility is to increase the duration of the speckle reduction sequence by inserting intermediate partially correlated patterns between uncorrelated speckle patterns such that the speckle reduction sequence comprises a plurality of uncorrelated speckle patterns and a plurality of partially correlated speckle patterns. For example, when the total number n of speckle patterns in the speckle reduction sequence is at least 8, the number k of uncorrelated speckle patterns in the speckle reduction sequence is an integer greater than 3 while the number l of partially correlated speckle patterns in the speckle reduction sequence is an integer greater than 3.

As described above, an individual speckle pattern $I_x$ in the speckle reduction sequence is an uncorrelated speckle pattern when the absolute value of the correlation factor CF between the individual speckle pattern $I_x$ and any other speckle pattern in the speckle reduction sequence is from about 0 to about 0.1. Further, an individual speckle pattern $I_x$ in the speckle reduction sequence is a partially correlated speckle pattern when the absolute value of the correlation factor CF between the individual speckle pattern $I_x$ and at least one other speckle pattern in the speckle reduction sequence is from about 0.4 to about 0.6.

In one embodiment, individual ones of the uncorrelated speckle patterns are alternated with individual ones of the partially correlated speckle reduction patterns in the speckle reduction sequence. For example, a single uncorrelated speckle pattern may be projected followed by a single partially correlated speckle pattern, etc. In an alternative embodiment the speckle reduction sequence comprises a plurality of consecutive uncorrelated speckle patterns alternated with one or more consecutive partially correlated speckle patterns. For example, two partially correlated speckle patterns may be projected in sequence followed by two uncorrelated speckle patterns projected in sequence followed by two partially correlated speckle patterns projected in sequence, etc. In yet another alternative embodiment, the speckle reduction sequence comprises a plurality of consecutive partially correlated speckle patterns alternated with one or more consecutive uncorrelated speckle patterns. For example, two partially correlated speckle patterns may be projected in sequence followed by a single uncorrelated speckle pattern followed by two partially correlated speckle patterns projected in sequence, etc.

Each speckle pattern (either uncorrelated or partially correlated) in the speckle reduction sequence is created by varying a physical property of the output beam 109a of the light source 108a. In the embodiments described herein, the physical property may be the wavelength of the output beam 109a, the polarization of the output beam 109a, the angle of incidence of the output beam 109a with respect to the projection surface 300, or various combinations of the wavelength, polarization and/or angle of incidence.

For example, in the embodiment in which the light source 108a comprises a DBR laser as described above, the wavelength of the output beam 109a of the light source 108a is varied by adjusting a current supplied to the wavelength selective section of the DBR laser by the system controller 107 communicatively coupled to the DBR laser. In embodiments in which the light source 108a is a frequency converted light source comprising a semiconductor laser optically coupled to a wavelength conversion device shown in FIG. 2, the wavelength of the output beam 109a emitted by the light source 108a may be varied by heating the waveguide portion of the wavelength conversion device. Alternatively, the wavelength of the output beam 109a emitted by the light source 108a may be varied by application of an electric field to the wavelength conversion device. Heating the waveguide portion of the wavelength conversion device or applying an electric field to the wavelength conversion device may be controlled by the system controller 107 so as to achieve the desired change in wavelength at the appropriate time intervals.

In embodiments where the wavelength of the output beam 109a of the light source 108a is varied to produce different uncorrelated speckle patterns and/or partially correlated speckle patterns, the variation in wavelength between uncorrelated speckle patterns is at least 0.3 nm. For example, if the output beam 109a has a first wavelength of 530 nm (i.e., the first wavelength is in the green portion of the visible spectrum), the first wavelength of the output beam 109a may be varied by at least ±0.3 nm to a second wavelength of either 530.15 nm or 529.85 nm. In this example, the speckle patterns produced with wavelengths of 530 nm, 530.15 nm and 529.85 nm are uncorrelated with respect to one another.

However, for an output beam 109a with a specific polarization, a variation in wavelength of less than 0.3 nm results in a partially correlated speckle pattern. More specifically, if an output beam 109a has a fixed polarization and the wavelength of the output beam may be varied over a range between a first wavelength and a second wavelength which are separated by at least ±0.3 nm, the wavelength of the output beam 109a may be varied to an intermediate wavelength between the first wavelength and the second wavelength to produce a partially correlated speckle pattern with respect to speckle patterns formed at either the first wavelength or the second wavelength. For example, if the wavelength of an output beam 109a of the light source 108a is variable between a first wavelength of 529.85 nm and a second wavelength of 530.15 nm, the wavelength of the output beam 109a may be varied to an intermediate wavelength of 530 nm to produce a speckle pattern which is partially correlated with speckle patterns produced at either the first wavelength or the second wavelength (assuming the polarization of the output beam remains the same at the first wavelength, the second wavelength, and the intermediate wavelength). While the speckle pattern produced at 530 nm is only partially correlated with respect to the speckle patterns produced at 530.15 nm and 529.85 nm, it should be understood that, the speckle patterns produced at 530.15 nm and 529.85 nm are uncorrelated with respect to each other (i.e., the difference in wavelength is at least 0.3 nm).

Still referring to FIG. 1, different correlated and uncorrelated speckle patterns may also be created by changing the polarization of the output beam 109a emitted by the light source 108a using the polarization rotator 106. For example, for an output beam with a fixed wavelength, the polarization of the output beam may be changed from a first polarization to a second polarization which is orthogonal to the first polarization. In this example, the speckle pattern produced with the output beam of the first polarization is uncorrelated with the speckle pattern produced with the output beam having the second polarization. However, if the polarization of the output beam 109a is varied from the first polarization to an intermediate polarization which is non-orthogonal with the first polarization and the second polarization, then the speckle pattern produced with the output beam with the first polarization and the speckle pattern produced by the output beam with the intermediate polarization are partially correlated. It should be understood that multiple intermediate polarizations between the orthogonal first and second polarizations may be utilized to create multiple partially correlated speckle patterns. For example, the number of intermediate polarizations may be two (i.e., a first intermediate polarization and a second intermediate polarization) or more with each intermediate polarization being non-orthogonal with the first and second polarizations.

Figure 6:
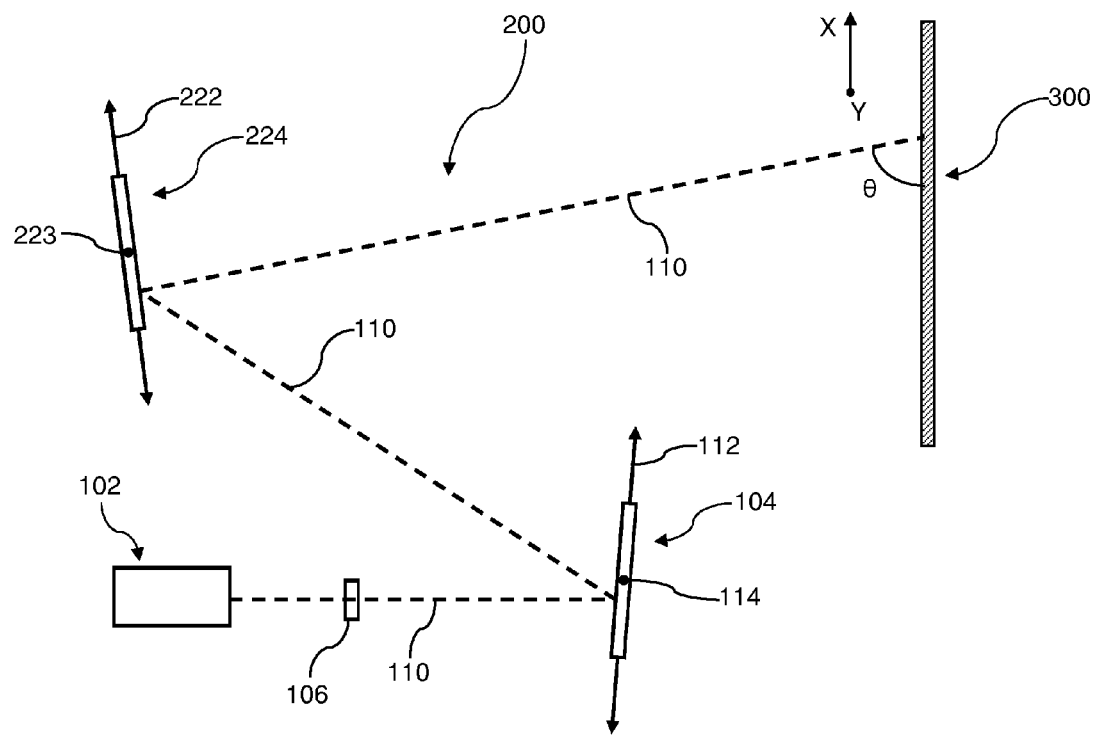
FIG. 6 schematically depicts another embodiment of a scanning laser projector for use in conjunction with one or more embodiments of the methods for operating a scanning laser projector described herein.

Referring now to FIG. 6, in another embodiment, different correlated and uncorrelated speckle patterns may also be created by changing the angle $\theta$ at which the output beam of the composite light source 102 is incident on the projection surface 300. It has been determined that, when using materials for the screen such as paper or painted surfaces, a change in the angle of incidence of the output beam on the screen of about 1.5 mRd is sufficient enough to create uncorrelated speckle patterns when the distance from the observer to the screen is about half a meter. For example, in the embodiment of the scanning laser projector system 200 shown in FIG. 6, the scanning laser projector system 200 includes a composite light source 102, a polarization rotator 106, and a first scanning mirror 104, as described above. However, in this embodiment, the scanning laser projector system 200 also comprises a second scanning mirror 224. This second scanning mirror has a similar configuration as the first scanning mirror 104 described above. Specifically, the second scanning mirror 204 may comprise a mirror coupled to an actuator, such as a MEMS actuator or similar actuator, such that the orientation of the mirror is adjustable about at least two axes 222, 223. The first scanning mirror 104 is positioned in the optical pathway of the output beam of the composite light source 102 and is oriented to redirect the output beam 110 of the composite light source 102 (which includes the output beam 109a of the light source 108a) onto the second scanning mirror 224 and scan the output beam 110 over the surface of the second scanning mirror in two directions. The second scanning mirror 224 is positioned to redirect the output beam 110 onto the projection surface 300. Further, the orientation of the second scanning mirror 224 may be adjusted about the first scanning axis 222 and the second scanning axis 223 to change the angle of incidence $\theta$ of the output beam on the projection surface.

In this embodiment, the correlation factor between two speckle patterns produced by the output beam changes with the angle of incidence $\theta$ of the output beam. Uncorrelated speckle patterns may be formed with the output beam by varying the angle of incidence of the output beam by at least $\pm 1.5$ mRad between consecutive speckle reduction patterns. For example, if the output beam 110 has a first angle of incidence $\theta_1$, the first angle of incidence $\theta_1$ of the output beam 110 may be varied by at least 1.5 mRad to a second angle of incidence $\theta_2$. In this example, the speckle pattern produced with the output beam with the first angle of incidence $\theta_1$ and the speckle pattern produced with the output beam with the second angle of incidence $\theta_2$ are uncorrelated speckle patterns with respect to one another (i.e., the change in the angle of incidence is at least 1.5 mRad).

However, if the output beam has a fixed polarization and wavelength and the first angle of incidence $\theta_1$ is varied by less than 1.5 mRad, the speckle pattern formed by varying the angle of incidence will produce a speckle pattern which is only partially correlated with the speckle pattern formed by the first angle of incidence $\theta_1$. More specifically, if an output beam 110 has a fixed polarization and wavelength and the angle of incidence of the output beam 110 is variable over a range between a first angle of incidence $\theta_1$ and a second angle of incidence $\theta_2$ which are separated by at least 1.5 mRad, the first angle of incidence $\theta_1$ of the output beam may be varied to an intermediate angle of incidence $\theta_{In}$ between the first angle of incidence $\theta_1$ and the second angle of incidence $\theta_2$ to produce a partially correlated speckle pattern with respect to speckle patterns formed at either the first angle of incidence $\theta_1$ or the second angle of incidence $\theta_2$.

For example, if the angle of incidence of the output beam 110 of the light source 108a is variable between a first angle of incidence $\theta_1$ and a second angle of incidence $\theta_2$, the angle of incidence $\theta_1$ of the output beam may be varied to an intermediate angle of incidence $\theta_{In}$ between $\theta_1$ and $\theta_2$ to produce a speckle pattern which is partially correlated with speckle patterns produced at either the first angle of incidence $\theta_1$ or the second angle of incidence $\theta_2$ (assuming the polarization of the output beam remains the same at the first angle of incidence $\theta_1$, the second angle of incidence $\theta_2$, and the intermediate angle of incidence $\theta_{In}$). While the speckle pattern produced at the intermediate angle of incidence $\theta_{In}$ is only partially correlated with respect to the speckle patterns produced at the first angle of incidence $\theta_1$ and the second angle of incidence $\theta_2$, it should be understood that the speckle patterns produced at the first angle of incidence $\theta_1$ and the second angle of incidence $\theta_2$ are uncorrelated with respect to each other (i.e., the difference in the angle of incidence is at least 1.5 mRad).

Referring again to FIG. 1, in one embodiment, the light source 108a is operable to emit an output beam 109a and vary the wavelength of the output beam 109a over a range between a first wavelength A and a second wavelength B which are separated by at least 0.3 nm. For example, the first wavelength A may be in the range from about 529.85 nm to about 530.15 nm. However, it should be understood that different wavelength ranges (i.e., other than 529.85 nm-530.15 nm) may also be used depending on the specific characteristics of the light source 108a. It should also be understood that the end points of the wavelength range are sufficiently close such that there is not a perceivable difference in the color of the output beam when the wavelength is varied. The system controller 107 may be operable to vary the wavelength of the output beam 109a of the light source 108a from either the first wavelength A or the second wavelength B to an intermediate wavelength AB between the first wavelength A and the second wavelength B. For example, in one embodiment, the difference between the intermediate wavelength AB and either the first wavelength A or the second wavelength B may be about 0.15 nm. However, it should be understood that the intermediate wavelength AB need not be centered between the first wavelength A and the second wavelength B.

In this embodiment, the system controller 107 may be operable to control the polarization rotator 106 to vary the polarization of the output beam over a range between a first polarization P1 and a second polarization P2 which is orthogonal with the first polarization P1. More specifically, the system controller 107 may be operable to vary the polarization of the output beam 109a of the light source 108a from either the first polarization P1 or the second polarization P2 to a first intermediate polarization P12 which is non-orthogonal with either the first polarization P1 or the second polarization P2.

In this embodiment, the system controller 107 may be operable to vary the wavelength of the output beam 109a of the light source 108a to produce the following speckle reduction sequence of $I_n$ speckle reduction patterns:

$$A_{P1}-A_{P12}-A_{P2}-AB_{P2}-B_{P2}-B_{P12}-B_{P1}-AB_{P12},$$

where n=8, the number k of uncorrelated speckle patterns is 4 and the number of l partially correlated speckle patterns is 4. In this embodiment, $A_{P1}$, $A_{P2}$, $B_{P2}$, and, $B_{P1}$ are uncorrelated speckle patterns and $A_{P12}$, $AB_{P2}$, $B_{P12}$, and $AB_{P12}$ are partially correlated speckle patterns. This speckle reduction sequence has a period from about 0.07 seconds to about 0.13 seconds.

In another embodiment, the light source 108a is operable to emit an output beam 109a and change the wavelength of the output beam 109a from a first wavelength A to a second wavelength B which are separated by at least 0.3 nm. For example, the first wavelength A may be about 529.85 nm while the second wavelength B may be about 530.15 nm. The system controller 107 may be operable to change the wavelength of the output beam 109a of the light source 108a from the first wavelength A to the second wavelength B as described hereinabove.

In this embodiment, the system controller 107 may be operable to control the polarization rotator 106 to vary the polarization of the output beam 109a over a range between a first polarization P1 and a second polarization P2 where the first polarization P1 is orthogonal with the second polarization P2. The system controller 107 may be operable to vary the polarization of the output beam 109a of the light source 108a from either the first polarization P1 or the second polarization P2 to a first intermediate polarization P12 or a second intermediate polarization P21. The first intermediate polarization P12 and the second intermediate polarization P21 are both non-orthogonal with the first polarization P1 and the second polarization P2.

In this embodiment, the system controller 107 may be operable to vary the wavelength of the output beam 109a of the light source 108a to produce the following speckle reduction sequence of $I_n$ speckle reduction patterns:

$$A_{P1}-A_{P12}-A_{P21}-A_{P2}-B_{P1}-B_{P12}-B_{P21}-B_{P2}$$

where n=8, the number k of uncorrelated speckle patterns is 4 and the number of l partially correlated speckle patterns is 4. In this embodiment $A_{P1}$, $A_{P2}$, $B_{P2}$, and, $B_{P1}$ are uncorrelated speckle patterns and $A_{P12}$, $A_{P21}$, $B_{P12}$, and $B_{P21}$ are partially correlated speckle patterns. This speckle reduction sequence has a period from about 0.07 seconds to about 0.13 seconds.

The aforementioned techniques for reducing speckle may be referred to as slow speckle reduction techniques given the period of the speckle reduction sequence relative. In another embodiment, a combination of speckle reduction techniques can be used. For example, a combination of one slow speckle reduction techniques, as described above, may be used with other speckle reduction methods that are faster than the pixel duration. In one embodiment, the slow speckle reduction techniques described hereinabove may be used in conjunction with a speckle reduction sequence which is projected at over a period which is faster than the integration time of the human eye (i.e., faster than about 0.04 seconds). In that case, the speckle reduction sequence may comprise a succession of speckle patterns (A,B/A,B/ . . . ) which is projected at 30 Hz such that the speckle contrast of each single frame is lower than a fully developed speckle.

Figure 7:
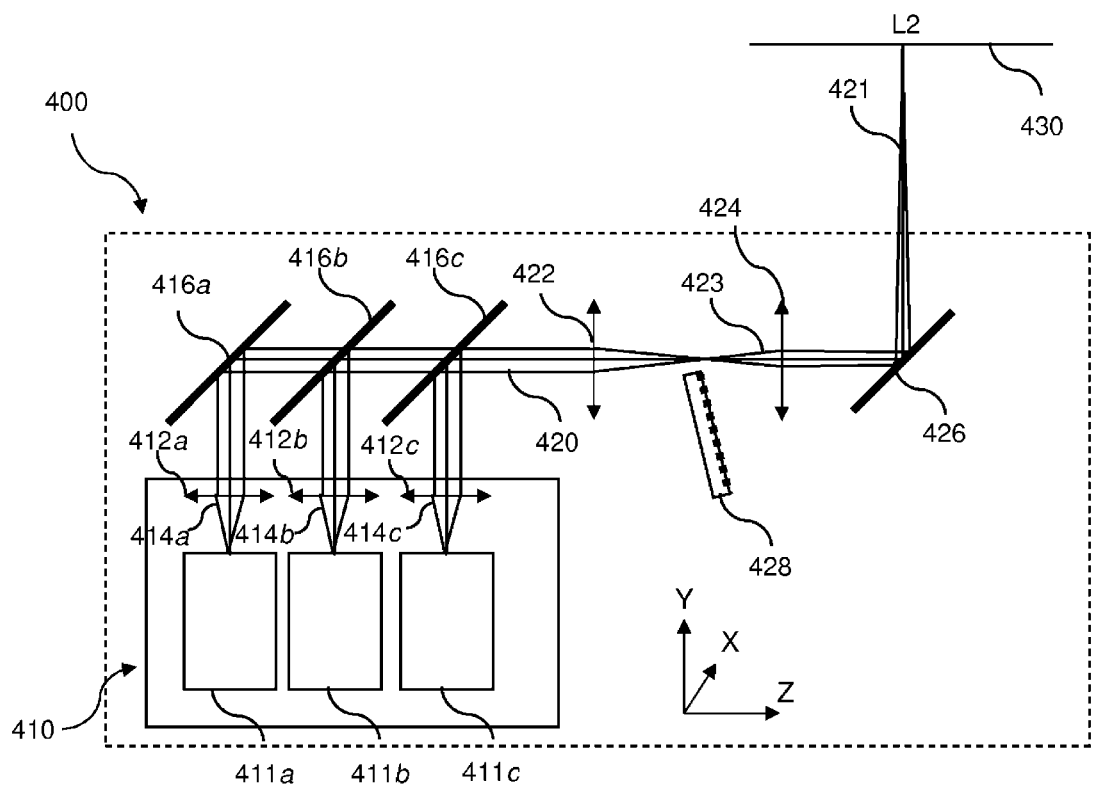
FIG. 7 depicts a schematic illustration of a laser projection system operating in an infinite depth of focus mode according to one or more embodiments.

For example, referring now to FIG. 7, a schematic illustration of one embodiment of a laser projection system 400 is illustrated which may be used to generate speckle patterns at a rate faster than the integration time of the human eye. The exemplary laser projection system 400 is configured as a scanning laser projection system that is programmed to two-dimensionally scan an output beam 420 generated by a light source 410 and reflected (or transmitted) by an optical scanning component 426 to create a two-dimensional image at a given projection surface 430, such as a wall or a projector screen, for example. As described in more detail below, some embodiments may comprise a polarization scrambling device 429. The laser projection system 400 may be used to display static images (e.g., text), moving images (e.g., video), or both. The system may be compact such that it may be incorporated into a relatively small device, such as a hand-held projector, cell phone, personal data assistant, notebook computer or other similar devices.

The light source 410 may comprise one or more lasers. The embodiment illustrated in FIGS. 7 and 8 comprises three lasers 411a, 411b and 411c that are operable to emit coherent beams at different wavelengths. Mirrors and dichroic mirrors can be used, as an example, to combine the three emitted beams 414a, 414b and 414c into one single emitted beam 420. For example, the light source 410 may comprise three lasers capable of emitting beams of red, blue and green wavelengths, respectively. According to some embodiments, the output beam 420 consists of nearly collimated green, red and blue beams. For example, the first laser 411a may emit a beam 414a having a wavelength in the green spectral range, the second laser 411b may emit a beam 414b having a wavelength in the red spectral range, and the third laser 411c may emit a beam 414c having a wavelength in the blue spectral range. Other embodiments may utilize a light source 410 that emits more or fewer collimated laser beams, and/or beams at wavelengths other than green, red or blue. For example, output beam 420 may be a single output beam having a wavelength in the green spectral range.

The light source 410 may comprise one or more single-wavelength lasers, such as distributed feedback (DFB) lasers, distributed Bragg reflector (DBR) lasers, vertical cavity surface-emitting lasers (VCSEL), diode pumped solid state lasers (DPSS), native green lasers, vertical external cavity surface-emitting lasers (VECSEL) or Fabry-Perot lasers, for example. Additionally, to generate a green beam, the light source 410 of some embodiments may also comprise a wavelength conversion device (not shown) such as a second harmonic generating (SHG) crystal or a higher harmonic generating crystal to frequency-double a laser beam having a native wavelength in the infrared band. For example, an SHG crystal, such as an MgO-doped periodically poled lithium niobate (PPLN) crystal, may be used to generate green light by converting the wavelength of a 1060 nm DBR or DFB laser to 530 nm. The light source 410 may also comprise lasers other than single wavelength lasers, such as lasers capable of emission of multiple wavelengths. In other embodiments, the light source 410 may comprise a laser capable of emitting a native green laser without the use of a wavelength conversion device.

The light source 410 may also comprise light source lenses 412a-412c positioned in an optical path of each beam produced by the lasers 411a-411c. The light source lenses may provide nearly collimated beams 414a-414c that exit the light source 410. In other embodiments, the light source 410 may not comprise a light source lens and the beam or beams may exit the light source 410 in a non-collimated state. In one embodiment, the laser projection system 400 further comprises reflective surfaces 416a-416c that are positioned and configured to reflect and combine the three beams 414a-414c produced by the lasers 411a-411c into an output beam 420. The output beam 420 may be a single beam comprising laser beams 414a-414c, or it may be three beams comprising laser beams 414a-414c. For example, the laser beams 414a-414c may be spatially separated and not combined into a single output beam 420. In embodiments that utilize only one laser, the laser projection system 400 may not utilize a reflective surface. Further, it should be understood that other beam combiner devices may be utilized.

The laser projection system 400 may be programmed to perform many of the control functions disclosed herein. The system 400 may be programmed in numerous ways, including conventional or yet-to-be-developed programming methods. Methods of programming the system 400 discussed herein are not intended to limit the embodiments to any specific way of programming In some embodiments, the laser projection system 400 may include one or more system controllers (not shown), such as microcontrollers, for example, that are programmed to control the light source 410 to generate a single or multi-color image data stream. The system controller, along with image projection software and associated electronics known in the art, may provide the light source with one or more image data signals (e.g., laser drive currents) that carry image data. To create the desired image, the light source 410 may then emit the encoded image data in the form of gain or intensity variations of the output beam 420. However, some embodiments may utilize other controller or programming means to generate the scanned laser image.

A focusing optical component 422 may be positioned in an optical path of the output beam 420 such that the output beam 420 first passes through the focusing optical component 422. A speckle reduction diffusing surface 428 may be selectively introduced into the optical path of the output beam 420 after the focusing optical component and before the optical scanning component 426. The focusing optical component 422 has a focal length that produces a first focused point of the output beam 420 (i.e., either a single output beam of beams 414a-414c, or three focused points) at a location L1 inside of the laser projection system 400. The light 423 provided by the output beam 420 originating from L1 is then re-imaged on a second focus point at location L2 on the projection surface 430 via a collimating component 424 and the optical scanning component 426 as converging beam 421. When the diffusing surface is inserted into the optical path, it should preferably be located at the proximity of the first focused point L1.

The optical scanning component 426 is positioned in the optical path of the output beam 420 after the focusing component 422. The optical scanning component 426 may comprise one or more controllable and movable micro-opto-electromechanical systems (MOEMS) or micro-electromechanical systems (MEMS) configured to two-dimensionally scan the output beam 420 toward the projection surface 430 to illuminate a plurality of pixels forming an image frame at an image frame rate. Other scanning components such as spinning polygons, resonant mirrors or galvanometric mirrors may also be used. The scanned output beam is illustrated as converging output beam 421 in FIGS. 7 and 8. Successive image frames make up the scanned laser image. It is also contemplated that the MOEMS or MEMS be operatively coupled to a mirror or a prism that is configured to redirect the output beam 420 accordingly. The focusing component 422 focuses the output beam 420 onto the optical scanning component 426.

FIG. 7 illustrates the system 400 operating in an infinite depth of focus mode (i.e., a non-speckle reduction mode). The optical properties of the focusing optical component 422 and the collimating component 424 are such that that the convergence angle of the converging output beam 421 hitting the projection surface is small enough so that images appearing on the projection surface remain sharp independently of the projection distance and without requiring any focus adjustment inside of the laser projector system 400. Further, the optical properties of the focusing optical component 422 and the collimating component 424 are such that the beam spot size on the projection surface 430 is small enough to satisfy an image resolution requirement. Typically the beam spot size on the projection surface 430 should be approximately the same size as the image pixel size. As illustrated in FIG. 7, when operating in the infinite depth of focus mode, the speckle reduction diffusing surface 428 is not introduced into the optical path of the output beam 420. When the laser projection system 400 is operated in the infinite depth of focus mode, the depth of focus is very large and therefore there is no need for focus adjustments to achieve a focused scanned laser image on the projection surface 430. To meet that condition, the convergence angle of the converging output beam 421 should be relatively small, thereby resulting in a relatively small beam diameter of the beam on the optical scanning component 426. However, the consequence of the small convergence angle is that there is not much speckle reduction.

Figure 8:
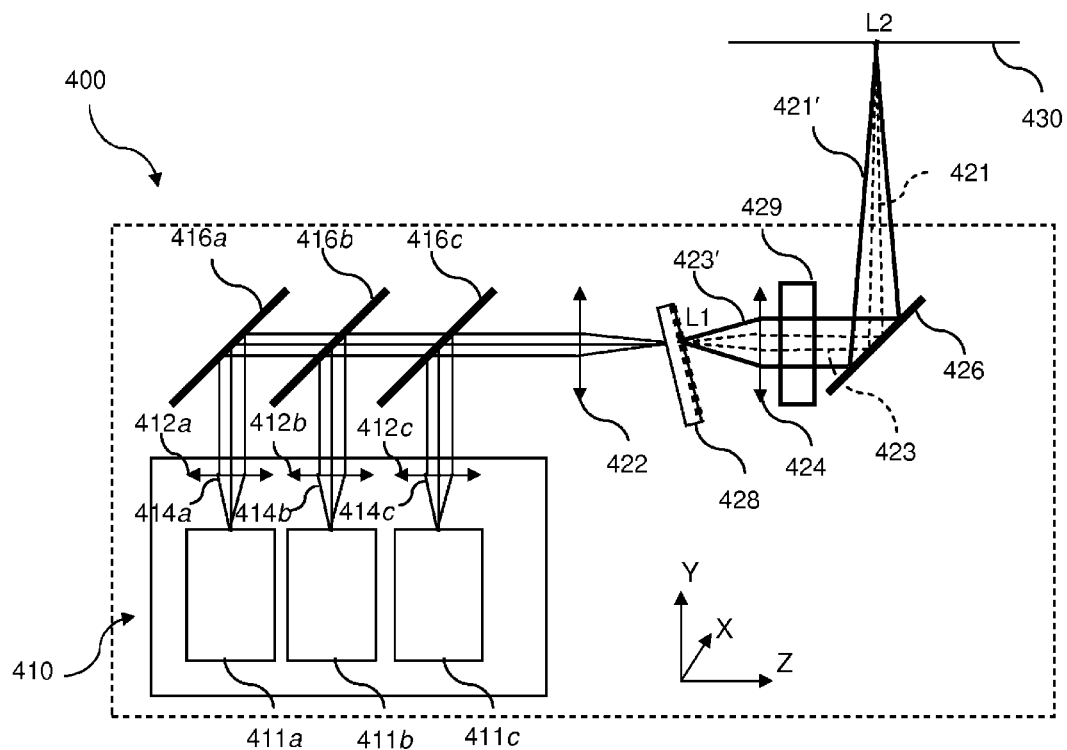
FIG. 8 depicts a schematic illustration of a laser projection system operating in a speckle reduction mode according to one or more embodiments.

FIG. 8 illustrates the laser projection system 400 operating in a speckle reduction mode. As illustrated in FIG. 8, the speckle reduction diffusing surface 428 is introduced into the optical path of the focused output beam 420 at a location that is proximate to the location of the first focused point L1. The speckle reduction diffusing surface 428 may be mechanically moved into and out of the optical path by an actuator, for example. Light 423' originating from the first focused point at location L1 after having been transmitted by the speckle reduction diffusing surface 428 is re-imaged on a second focused point at location L2 on the projection surface 430 (i.e., the projection screen) via the collimating component 424 and the optical scanning component 426. The converging output beam 421' illuminates the second focused point at location L2. Since the first focused point is imaged at the second focused point at location L2 on the projection surface, the amplitude profile of the converging output beam 421 on the projection surface 430 is not significantly modified, meaning that the beam spot size has not changed with respect to the previous projector configuration described and illustrated in FIG. 7. In other words, because the speckle reduction diffusing surface 428 is positioned prior to the optical scanning component 426 and is located close to the first focused point L1 which is re-imaged on at second focused point location L2 on the projection surface 430, the introduction of the speckle reduction diffusing surface 428 does not affect the sharpness image on the projection surface 430. Now, since the speckle reduction diffusing surface 428 is imaged on the projection surface 430, some high spatial frequency modulation of the phase of the electric filed is added to the beam spot on the projection surface 430. As the optical scanning component 426 scans the converging output beam 421', a position of the phase modulation provided by the speckle reduction diffusing surface 428 follows the output beam as it is rapidly scanned by the optical scanning component 426, thereby resulting in rapidly moving the phase modulation with respect to the projection surface 430. The consequence is that the appearance of speckle to an observer is reduced. Moreover, in this embodiment, the image of the speckle diffusing surface 428 on the projection surface 430 changes at a rate faster than the pixel duration (i.e., faster than 20 ns), and, as such, speckle is reduced at speeds faster than the duration needed to produce a single image. As a consequence, the speckle contrast of each single projected frame is attenuated and the overall speckle impression can be decreased without creating any image flicker. This type of speckle reduction in which a speckle reduction diffusing surface is used is referred to herein as instantaneous speckle reduction.

FIG. 8 also illustrates that the divergence of the output beam originated from the location of the first focused point L1 increases with the insertion of the speckle reduction diffusing surface 428, which causes the convergence angle of the converging output beam 421' to correspondingly increase. Therefore, depending on the convergence angle, it may not be possible to maintain sharp images independently of the distance from the laser projection system 400 to the projection surface 430. Accordingly, depending on the convergence angle, a focusing mechanism or mechanisms may be utilized to ensure that the converging output beam 421' is focused at the projection surface 430. In one embodiment, the collimating component 424 may be translated along the Z-axis to properly image the speckle reduction diffusing surface 428 on the projection surface 430 for many projection distances. In another embodiment, the speckle reduction diffusing surface 428 may be tilted about the X-axis such that the speckle reduction diffusing surface 428 is angled with respect to the Y-axis. Focus adjustments may be provided by translating the speckle reduction diffusing surface 428 along the Y-axis. Due to the tilt of the speckle reduction diffusing surface 428, a motion along the Y-axis results in moving the active surface of the speckle reduction diffusing surface 428 (i.e., the portion of the speckle reduction diffusing surface 428 of which the output beam is illuminating) along the Z-axis, which is equivalent to varying the focus of the laser projection system 400. It should be understood that the various axes described herein are for illustrative purposes only and no particular limitations as to orientation are intended.

The parameters of the laser projection system should be optimized to achieve the proper image resolution as well as the infinite depth of focus in the non-speckle reduction mode illustrated in FIG. 7 and the desired speckle reduction in the speckle reduction mode illustrated in FIG. 8. The infinite depth of focus may be analyzed by assuming that laser beams are nearly Gaussian and propagate to the projection surface 430 according to conventional Gaussian beam propagation laws. To illustrate how to achieve the infinite depth of focus, assume a case where the image resolution in one direction is 800 pixels along one direction of the image (i.e., an image line of the scanned laser image comprises 800 pixels) and the deflection angle of the scanning device is 40 degrees in that same direction. In first approximation, the image pixel size on the projection surface may be given by:

$$\text{Pixel} = 2*D*tg(\theta/2)/R, \quad \text{Eq. (1)},$$

where:
Pixel is the pixel size,
D is the projection distance,
θ is the projection angle of the laser projection system (40 degrees), and
R is the native resolution of the laser projection system in one direction (800 pixels).

Since the pixel size is equal to 0.9E-3 times the projection distance, an angle of 0.9 mRd may be associated with the pixel, which is called the angular extend of the pixel. To achieve the resolution of 800 pixels, it may be shown that the beam spot size on the projection surface illuminated by the collimating output beam (full width at half maximum (FWHM)) should be roughly equal to the image pixel size to obtain the highest resolution over the widest range of projection distances D. The Gaussian beam propagation rules may then be applied to calculate the beam spot size as a function of the projection distance D.

Figure 9:
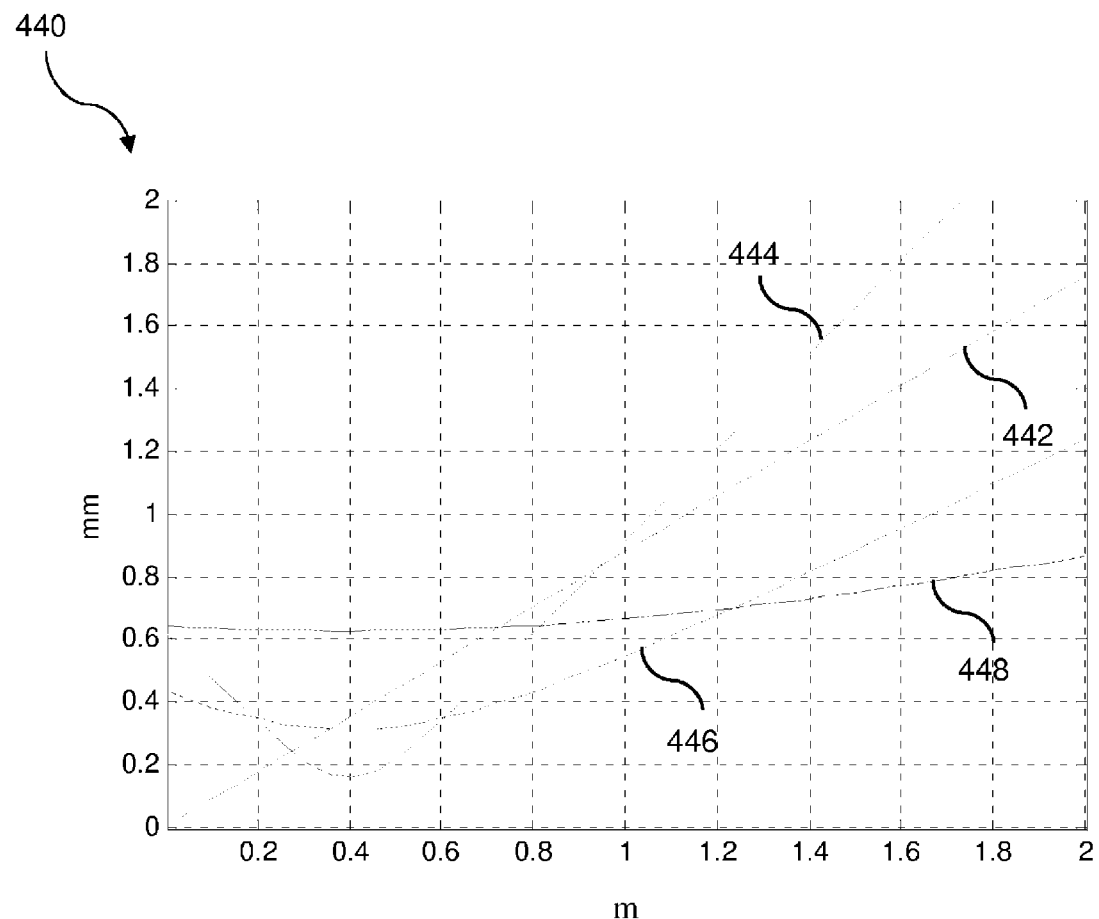
FIG. 9 depicts a graph of the surface beam spot size full-width at half-maximum and pixel size on a projection surface versus projection distance D according to one or more embodiments.

FIG. 9 illustrates a graph 440 that depicts the size of the surface beam spot FWHM and the pixel size (y-axis) versus projection distance D (x-axis). Curve 442 represents the size of the image pixels as a function of projection distance D. Curve 444 shows the surface beam spot size assuming that the optical components described above have been configured to create a very small beam 0.4 meters away from the laser projection system. As can be seen from the graph 440, the surface beam spot size expands faster than the pixel size and, after about a meter, the beam becomes bigger than the image pixels resulting in a degradation of the image resolution. For the case depicted by curve 448, the beam convergence is set much lower resulting in creating a larger beam size 400 mm away from the laser projection system. In this case, the proper image resolution is only achieved for distances larger than 0.7 meters. Curve 446 is closer to the ideal situation where the convergence angle of the Gaussian beam is set to be equal to the pixel angular extend. As illustrated in the graph 440, the case where the convergence angle of the Gaussian beam is set to be equal to the pixel angular extend provides the widest range of the projection distances where the image resolution is achieved (i.e., where the surface beam spot size is smaller than the image pixel size). In the numeric example described above, this corresponds to a beam diameter on the optical scanning component in the order of 0.4 to 0.5 mm (FWHM).

It may be shown that the level of speckle reduction that may be achieved depends on many parameters. The present inventor has recognized that speckle attenuation may be achieved using an output beam diameter of less than 6 mm incident on the optical scanning component (i.e., MEMS scanning mirror) when the projection surface is a bulk scattering surface. A bulk scattering projection surface is a projection surface in which light penetrates into the material of the projection surface and spreads over some distance rather than being scattered on the surface. Bulk scattering projection surface materials may include, but are not limited to, paper, painted surfaces, cardboard and fabric. When using such types of screen materials, the present inventor recognizes that speckle can be significantly decreased without requiring to use very large sizes for the scanning component. Because the output beam diameter on the optical scanning component is relatively smaller, the optical scanning component may rotate fast enough to generate the scanned laser image and the depth of focus may be improved.

To quantify the effect of beam size on the optical scanning component on speckle contrast with real projector materials, an experimental set-up was constructed consisting of a large, slow MEMS scanning mirror. The following example is intended for illustrative purposes only and not as a limitation. The speckle was measured as a function of output beam diameter incident on the MEMS scanning mirror. Assume that the projection distance D is set to 0.5 m, the observer to the projection surface is also set to 0.5 m, and the observer eye pupil diameter is 6 mm in dark room illumination conditions. The MEMS scanning mirror had a diameter of 3.6×3.2 mm, and the frame rate was 1 Hz and therefore made the images invisible to the human eye. The resulting scanned images were measured with an eye simulator having an integration time set a one second and a light collection angle of 12 mRd (e.g., similar to a 6 mm eye pupil located 0.5 meters away from the screen). The distance between the image lines was smaller than the surface beam spot so the image lines completely overlapped. The size of the beam on the MEMS scanning mirror was varied by the use of a liquid lens and a collimating lens of the laser light source, and was measured with a CCD camera. Theoretical results were also derived using a model consisting of creating a Gaussian beam spot on the projection surface and calculating a speckle pattern for each position of the Gaussian beam spot on the projection surface. The final image of the model was obtained by summing the intensity of the images calculated as a function of the Gaussian beam spot position. The inter-line distance between image lines was set equal to the Gaussian beam FWHM. The model assumed that the project surface was a surface scattering material having a random rough surface with a roughness depth in the order of the wavelength of the beam.

Figure 10:
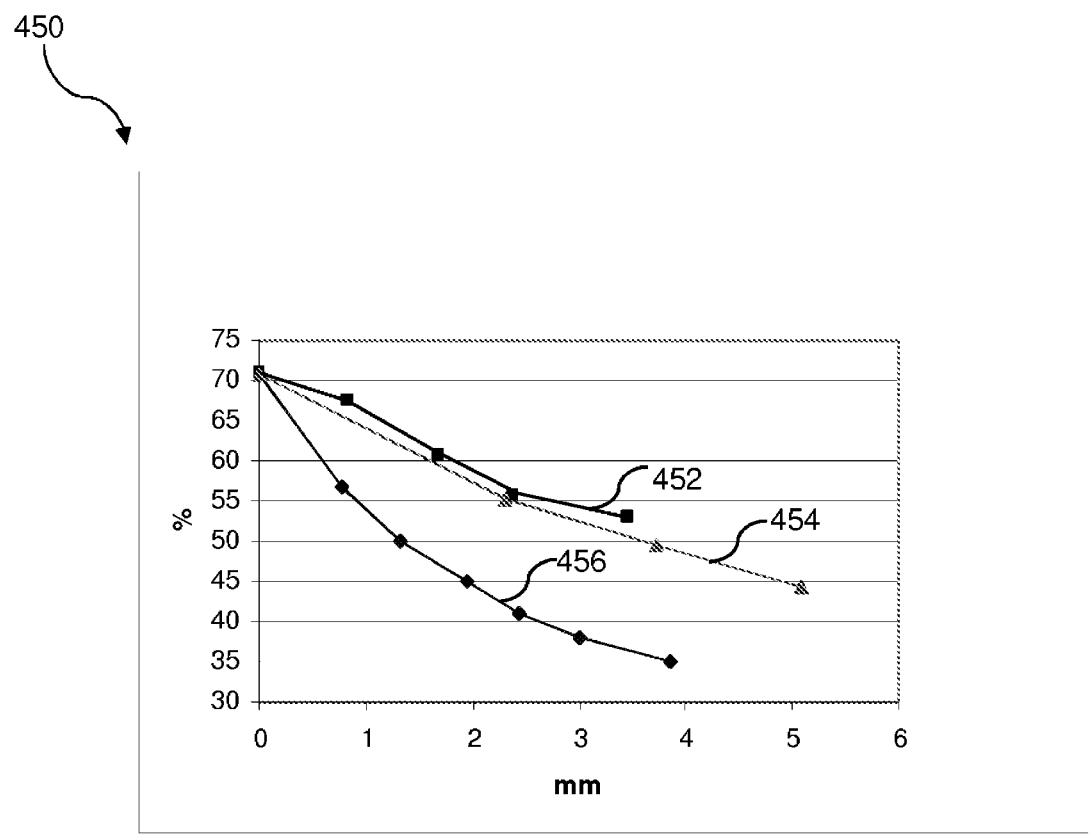
FIG. 10 depicts a graph of speckle contrast versus $1/e^2$ output beam diameter according to one or more embodiments.

FIG. 10 illustrates a graph 450 that plots the experimental data resulting from the above experimental set-up using a rough metal screen (curve 452) as the surface scatting projection surface and a paper screen (curve 456) as the bulk scattering projection surface. The y-axis is the speckle contrast while the x-axis is the $1/e^2$ beam diameter of the output beam on the MEMS scanning mirror. $1/e^2$ beam diameter is the distance between two points on the marginal distribution that are $1/e^2=0.135$ times the maximum intensity value. Curve 454 illustrates the theoretical results derived from the speckle contrast theory model. The rough metal screen follows closely to the model prediction which indicates that the model and the experimental set-up described above were valid. It should be noted that the curve 454 has been corrected to take into consideration the fact that the metallic surface used to measure curve 454 did not depolarize light. Experimental data for curve 454 have then been devised by $\sqrt{2}$ to enable a fair comparison with curve 456 where the projection surface was depolarizing the light. As shown in the graph 450, the speckle measured on the paper screen decreases much faster than the theoretical predictions (curve 454) and the rough metal screen (curve 452). The paper screen reaches about 42% speckle contrast with a $1/e^2$ beam diameter of about 2.2 mm on the MEMS scanning mirror. Conversely, the rough metal screen data did not approach 40% speckle contrast. By extrapolating curve 472, 40% speckle contrast may be achieved with a $1/e^2$ beam diameter greater than 6 mm. Therefore, a much smaller optical scanning component 426 may be utilized to achieve effective speckle contrast attenuation when projecting the scanned laser image on a bulk scattering projection surface. For example, the optical scanning component 426 may be slightly larger in diameter than the output beam diameter. In the above experiment, an optical scanning component having a diameter greater than 2.2 mm may be used to scan the image. However, the diameter should not be so large as to slow the rotation of the optical scanning component. A smaller diameter (e.g., between about 2.2 mm and about 3.5 mm, for example) may enable the MEMS-actuated mirror of the smaller optical scanning component 426 to rotate at the image frame rate (e.g., greater than 20 Hz) without falling behind the image frame rate.

Accordingly, with most existing projection surface materials, relatively low speckle amplitude such as 37% may be achieved with reasonable optical scanning component diameters such as 3.5 mm, for example. However, a speckle amplitude of 37% may not be low enough to remove the appearance of speckle to an observer, embodiments described herein may be used in conjunction with other speckle reduction techniques, such as spectral widening and/or polarization scrambling, for example.

As an example and not a limitation to illustrate how the laser projection system may be configured to meet both conditions of infinite depth of focus in the non-speckle reduction mode and speckle reduction in the speckle reduction mode, assume that one of the lasers (e.g., laser 411a) of the light source 410 is emitting a single-mode Gaussian beam with 8 degrees divergence at FWHM. The focal length of the laser collimating component 424 may be 2 mm as to produce a 0.28 mm FWHM collimated beam 421. The two other lens (422 and 424) focal length could be respectively 4 mm and 7 mm, so as to create a beam diameter around 0.5 mm (FWHM) on the scanning mirror and meet the infinite depth of focus condition when the speckle reduction diffusing surface 428 is not inserted in the optical path. Also, the focus of the collimating component 424 is adjusted to image the beam waist of the beam L1 at a nominal screen distance of around 400 mm When the speckle reduction diffusing surface 428 is inserted in the optical path, the diameter of the beam on the speckle reduction diffusing surface is directly related to the angle of diffusion of the speckle reduction diffusing surface:

$$\sin(\theta/2) = \Phi_{MEMS}/2/f_2, \qquad \text{Eq (2)},$$

where:

θ is the angle of diffusion of the speckle reduction diffusing surface, $\Phi_{MEMS}$ is the diameter of the output beam on the scanning component, and $F_2$ is the focal length of the collimating lens.

In the numeric example provided above, $f_2$ is about 7 mm. Thus, to get a beam diameter of 3.5 mm corresponding to a speckle amplitude of 37%, the angle of diffusion of the speckle reduction diffusing surface 428 or the order of about 33 degrees (full angle). The diameter of the optical scanning component should be at least 3.5 mm to avoid beam vignetting.

In one embodiment, the speckle reduction diffusing surface 428 creates an homogeneous angular energy distribution within the desired diffusion angle (e.g., 33 degrees illustrated in the example above). In another embodiment, the speckle reduction diffusing surface 428 may be configured in such a way that the output beam profile comprises a grid of many points. This may be achieved, for example, by the use of at least one holographic beam splitter. In yet another embodiment, the angular energy distribution emitted by the speckle reduction diffusing surface 428 may be a ring-like shape. The speckle reduction diffusing surface 428 may be obtained by using holographic diffusers or computer generated holograms. The speckle reduction diffusing surface 428 should be configured such that the diffraction efficiency is as high as possible (e.g., greater 90%) and most of the energy (e.g., greater than 90%) is diffracted in the first order of diffraction so that the energy is not wasted in parasitic orders of diffraction. To achieve high diffraction efficiencies, the speckle reduction diffusing surface 428 may be set at a specific angle with respect to the incident beam called the Bragg angle. Also, the speckle reduction diffusing surface 428 can be a transmissive component as shown on FIGS. 7 and 8, or also may be configured as a reflective diffusing component.

Figure 11:
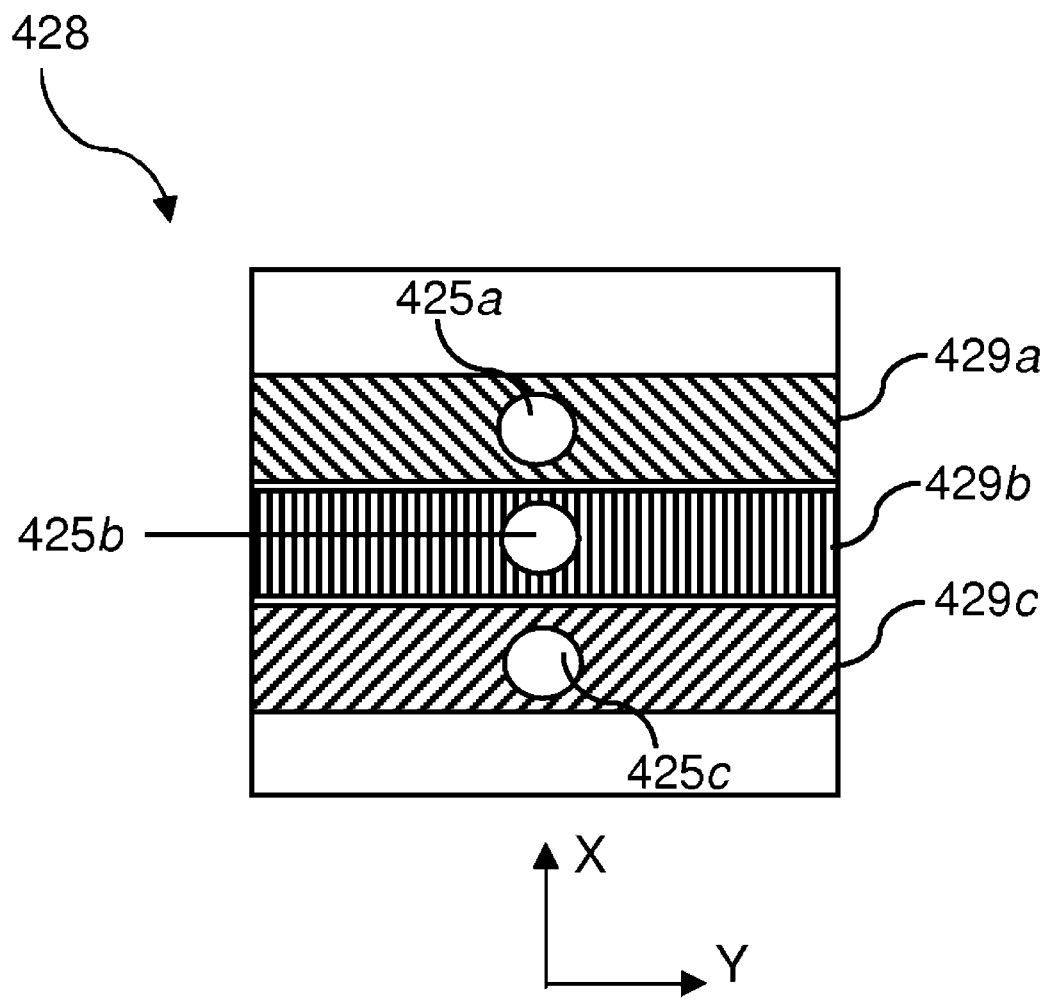
FIG. 11 depicts a schematic illustration of a speckle reduction diffusing surface and three focused points of an output beam according to one or more embodiments.

The inventor has recognized that, in embodiments wherein the light source 410 includes multiple color lasers (e.g., lasers 411a-411c), it may be difficult for the speckle reduction diffusing surface 428 to meet all requirements at the same time for all colors because parameters such as diffusion angle, diffraction efficiency and Bragg angle are functions of the laser beam wavelength. In one embodiment, the laser beams 414a-414c are angularly separated within the output beam 420 resulting in spatially separating the beams at the level of L1 located close to the focal plane of the focusing component. Referring to FIG. 11, the laser beams are illustrated on an exit portion of the speckle reduction diffusing surface 428. The laser beams are focused by the focusing component 422 to produce three different focused points 425a, 425b and 425c at the speckle reduction diffusing surface 428 separated along the X-axis. The speckle reduction diffusing surface 428 illustrated in FIG. 11 comprises three spatially separated regions 429a, 429b and 429c. The diffusion property of each of the spatially separated regions 429a-429c may be optimized for the wavelength of the corresponding laser beam associated with focused points 425a-425c. For wavelengths of particular colors, speckle contrast may not be a significant problem. Speckle in the blue color, for example, is usually invisible to an observer so the region associated with the blue laser beam (e.g., spatially separated region 429b) may be transparent with no or little diffusion.

The spatial separation of the laser beams may be accomplished by, for example, moving the light source lenses 412a-412c in the X axis direction so that the beams of the nearly collimated output beam 420 are not exactly pointing in the same directions. The spatial separation may also be accomplished by slightly misaligning the angle of reflection of the reflective surfaces 416a-416c. However, because the focused points 425a-425c are re-imaged on the projection surface, the three colors also will be spatially separated on the projection surface, which may lead to image resolution issues. To compensate for the spatial separation of the beam spots on the projection surface, the laser projection system may be programmed to introduce a time delay to the lasers 414a-414c such that the beam spots illuminate the same region to produce the desired pixels as the output beam 420 is scanned by the optical scanning component 426.

Further, the typical perception level under which observers consider that the image quality is acceptable despite the appearance of speckle is around 20% to 30% speckle contrast. To achieve 20% to 30% speckle contrast, a very large optical scanning component may be needed, which may not be practical. Therefore, it may be desirable to utilize the embodiments described herein in conjunction with other speckle reduction techniques such as polarization scrambling devices that modulate the polarization state of the output beam. Referring once again to FIG. 8, embodiments of the laser projection system 400 may also include a polarization scrambling device 429 positioned in an optical path of the output beam after the speckle reduction diffusing surface 428. As an example, a polarization split and delay unit as described in U.S. Pat. No. 7,653,097, which is herein incorporated by reference in its entirety, may be used for polarization modulation to rotate the polarization of the output beam at a speckle reduction frequency (e.g., at the image frame rate). The polarization split and delay unit may be positioned in the optical path after the collimating component 424 and before the optical scanning component 426.

In another embodiment, the polarization scrambling device 429 may comprise a polarization modulator such as, for example, a liquid crystal single cell that may be inserted into the optical path of the output beam as described above with respect to FIG. 1. The polarization modulator may then be modulated in such a way that the polarization of the laser beams switches between two orthogonal polarization states (such as S and P linear polarizations or circular left and circular right). The frequency of the polarization rotation can be set, for example, such that polarization switches from one state to the other one at the end of each projected image frame.

Spectral broadening of the output beam may also be utilized to achieve speckle contrast reduction. For example, an output beam in the green spectral range may have a spectral width of greater than about 0.5 nm wavelength to effectively reduce speckle. Spectral broadening and/or polarization scrambling may be utilized in conjunction with the diffuser embodiments described above to reduce the level of speckle contrast below 30%.

As an example and not a limitation, a speckle contrast level in the order of 25% may be achieved by illuminating a 3.5 mm output beam diameter incident on the optical scanning component with a speckle reduction diffusing surface in conjunction with polarization scrambling. As another example, a 1.5 mm output beam diameter may be illuminated on the optical scanning component with a speckle reduction diffusing surface in conjunction with polarization scrambling and an output beam spectral width of at least 0.6 nm for a green output beam.

In the embodiments of the laser projection system 400 with a speckle reduction diffusing surface 428, the speckle reduction diffusing surface may be used to project speckle reduction patterns which have less than fully developed speckle (i.e., patterns which have speckle contrast of less than 30%). Further, the laser projection system 400 may also be operated utilizing the slow speckle reduction techniques described hereinabove to generate a speckle reduction sequence comprising a series of speckle reduction patterns which have a period of less than the integration time of the human eye (i.e., less than 0.04 seconds).

For example, in one embodiment, a speckle reduction sequence consisting of two uncorrelated speckle patterns A and B (i.e., k=2) may be projected with the laser projection system 400. The uncorrelated speckle patterns A and B may be produced by varying the polarization, wavelength and/or angle of incidence of the beam used to produce the speckle patterns, as described above, such that the speckle patterns are uncorrelated. When the laser projector system 400 is operated in a non-speckle reduction mode (i.e., without use of the speckle reduction diffusing surface 428 as shown in FIG. 7), each of the first speckle pattern A and the second speckle pattern B may have fully developed speckle (i.e., the speckle pattern has a speckle contrast approaching 100%). However, if the speckle reduction diffusing surface 428 is utilized as shown in FIG. 8, each speckle pattern A or speckle pattern B may have a speckle contrast which is less than about 30%. Using the speckle reduction diffusing surface 428, the speckle reduction sequence consisting of alternating speckle patterns A and B may be projected at a frequency of 30 Hz (i.e., the period of the sequence is 0.033 seconds) to produce an image where each frame of the image has less than fully developed speckle thereby reducing the perceived amount of speckle in the image.

It should now be understood that the methods described herein may be utilized to reduce speckle and image flicker in an image projected with a light source of a scanning laser projector system. In one embodiment, speckle reduction sequences are utilized wherein the speckle reduction sequences have a period from about 0.07 seconds to about 0.13 seconds and comprise both uncorrelated and partially correlated speckle patterns. In another embodiment, speckle reduction sequences are utilized wherein the speckle reduction sequences have a period of less than about 0.04 seconds and comprise uncorrelated speckle patterns or a combination of uncorrelated speckle patterns and partially correlated speckle patterns. As such, it should be understood that the duration of the speckle reduction sequences utilized herein will have a period of less than about 0.04 seconds or from about 0.07 seconds to about 0.13 seconds to both reduce speckle and avoid image flicker.

While specific embodiments of speckle reduction sequences having various specific uncorrelated and partially correlated speckle patterns have been described herein, it should be understood that other combinations of uncorrelated and partially correlated speckle patterns may also be utilized. Furthermore, while specific embodiments of speckle reduction sequences described herein contain uncorrelated and partially correlated speckle patterns which are produced by varying the wavelength of the output beam of a laser source and the polarization of the output beam of a laser source, it should be understood that similar results (i.e., the reduction of speckle and image flicker) may also be achieved by using various combinations of changes in wavelength, changes in polarization, and changes in the angle of incidence of the output beam of the light source.

It should also be understood that, irrespective of the physical property that is varied, the variations in the physical property of the output beam are implemented and controlled by the system controller to facilitate systematically projecting a speckle reduction sequence of uncorrelated speckle patterns and partially correlated speckle patterns at the appropriate time intervals to reduce both speckle and image flicker in an image that is simultaneously projected with the speckle reduction sequence.

It is noted that recitations herein of a component of a particular embodiment being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for operating a light source of a scanning laser projector comprising: projecting an image comprising a plurality of frames with the light source of the scanning laser projector at a frame rate of the scanning laser projector; and changing a polarization and a wavelength of the light source to create a speckle reduction sequence comprising uncorrelated speckle patterns and partially correlated speckle patterns, wherein: the speckle reduction sequence is projected with the light source as the intensity of the light source is modulated to produce the image; a period of the speckle reduction sequence is less than about 0.04 seconds, or from about 0.07 seconds to about 0.13 seconds; individual ones of the uncorrelated speckle patterns comprise one of at least a first wavelength and a second wavelength and one of a first polarization or-and a second polarization, wherein the first polarization is orthogonal with the second polarization, both the first wavelength and the second wavelength are in a green spectral range, a blue spectral range, or a red spectral range, and a magnitude of a difference between at the first wavelength and the second wavelength is at least 0.3 nm; and individual ones of the partially correlated speckle patterns comprise an intermediate wavelength and an intermediate polarization, wherein the intermediate wavelength is between the first wavelength and the second wavelength and the intermediate polarization is non-orthogonal with the first polarization and the second polarization.

2. The method of claim 1 wherein the speckle reduction sequence comprises a plurality of uncorrelated speckle patterns, wherein a number k of uncorrelated speckle patterns is 2 and the duration of the speckle reduction sequence is less than about 0.04 seconds.

3. The method of claim 2 wherein the uncorrelated speckle patterns are produced utilizing an instantaneous speckle reduction technique.

4. The method of claim 1 wherein the speckle reduction sequence comprises a plurality of uncorrelated speckle reduction patterns and a plurality of partially correlated speckle patterns, wherein a number k of the uncorrelated speckle patterns in the speckle reduction sequence is an integer greater than or equal to 3 and a number l of the partially correlated speckle patterns in the speckle reduction sequence is an integer greater than or equal to 3.

5. The method of claim 1 wherein the speckle reduction sequence comprises a plurality of uncorrelated speckle patterns, wherein a number k of uncorrelated speckle patterns is greater than or equal to 6.

6. The method of claim 1, wherein a magnitude of a difference between the intermediate wavelength and either the first wavelength or the second wavelength is 0.15 nm.

7. A method for operating a light source of a scanning laser projector comprising:
   projecting an image comprising a plurality of frames with the light source of the scanning laser projector; and
   projecting a speckle reduction sequence comprising uncorrelated speckle patterns and partially correlated speckle patterns with the light source of the scanning laser projector while the image is projected, wherein:
      the speckle reduction sequence is projected by varying a wavelength and a polarization of an output beam of the light source of the scanning laser projector to produce the uncorrelated speckle patterns and the partially correlated speckle patterns;
      a duration of the speckle reduction sequence is from about 0.07 seconds to about 0.13 seconds;

a number k of the uncorrelated speckle patterns in the speckle reduction sequence is an integer greater than 3;

a number l of the partially correlated speckle patterns in the speckle reduction sequence is an integer greater than 3;

individual ones of the uncorrelated speckle patterns comprise one at least one of a first wavelength and a second wavelength, and one of a first polarization and a second polarization, wherein the first polarization is orthogonal with the second polarization, both the first wavelength and the second wavelength are in a green spectral range, a blue spectral range, or a red spectral range, and a magnitude of a difference between the first wavelength and the second wavelength is at least 0.3 nm; and individual ones of the partially correlated speckle patterns comprise an intermediate wavelength and an intermediate polarization, wherein the intermediate wavelength is between the first wavelength and the second wavelength and the intermediate polarization is non-orthogonal with the first polarization and the second polarization.

8. The method of claim 7, wherein individual ones of the uncorrelated speckle patterns are alternated with individual ones of the partially correlated speckle patterns within the speckle reduction sequence.

9. The method of claim 7, wherein a plurality of consecutive uncorrelated speckle patterns are alternated with a plurality of consecutive partially correlated speckle patterns within the speckle reduction sequence.

10. The method of claim 7, wherein:
an absolute value of a correlation factor of the partially correlated speckle patterns is in a range from about 0.4 to about 0.6; and
an absolute value of a correlation factor of the uncorrelated speckle patterns is in a range from about 0 to about 0.1.

11. The method of claim 7, wherein a magnitude of a difference between the intermediate wavelength and either the first wavelength or the second wavelength is 0.15 nm.

12. The method of claim 7, wherein the speckle reduction sequence is projected by varying the wavelength of the output beam, the polarization of the output beam, an angle of incidence of the output beam with respect to a projection surface, or combinations thereof.

13. The method of claim 7, wherein:
the polarization of the output beam is varied with a polarization rotator positioned in a pathway of the output beam of the light source of the scanning laser projector.

14. The method of claim 7, wherein:
the light source comprises a semiconductor laser optically coupled to a wavelength conversion device.

15. The method of claim 7, wherein the speckle reduction sequence is further projected by varying an angle of incidence of the output beam with respect to a projection surface.

16. The method of claim 7, wherein a sum of the number k of the uncorrelated speckle patterns and the number l of the partially correlated speckle patterns is greater than eight.

17. The method of claim 14, wherein the wavelength of the output beam is varied by applying an electric field to the wavelength conversion device or heating the wavelength conversion device.

18. The method of claim 15, wherein the angle of incidence is varied by at least 1.5 mRad.

* * * * *